United States Patent [19]

Hardwicke

[11] Patent Number: 5,100,205
[45] Date of Patent: Mar. 31, 1992

[54] DUAL WHEEL ADAPTER SYSTEM

[76] Inventor: Robert L. Hardwicke, 929 Portsmouth, Troy, Mich. 48084

[21] Appl. No.: 447,682

[22] Filed: Dec. 8, 1989

[51] Int. Cl.[5] .............................................. B60B 11/00
[52] U.S. Cl. .................... 301/36 R; 301/40 S
[58] Field of Search ............ 301/13 R, 13 SM, 36 R, 301/111, 128, 38 R, 39 R, 39 T, 40 R, 40 S, 41 R

[56] References Cited

U.S. PATENT DOCUMENTS

| | | | |
|---|---|---|---|
| 1,948,136 | 2/1934 | Scheckler | 301/38 R |
| 2,609,247 | 9/1952 | Carter | 301/36 R |
| 2,973,209 | 2/1961 | Shaw | 301/38 R X |
| 3,515,436 | 2/1970 | Giacobbe | 301/38 R |
| 4,220,372 | 9/1980 | Johansen et al. | 301/13 SM X |
| 4,261,621 | 4/1981 | Fox | 301/36 R |
| 4,333,688 | 6/1982 | Lemmon et al. | 301/36 R |
| 4,818,031 | 4/1989 | Brown | 301/36 R |

FOREIGN PATENT DOCUMENTS 1296030 9/1969 Fed. Rep. of Germany .... 301/36 R

Primary Examiner—Russell D. Stormer
Attorney, Agent, or Firm—John R. Benefiel

[57] ABSTRACT

An adapter system for mounting dual wheel sets to a drive axle of a utility vehicle including an inside wheel having a specially configured web center piece which receives the original studs carried by the axle hub to be mounted thereto, and also mounts a set of auxiliary studs. An adapter extension member is mounted to the auxiliary studs and has a stud flange at the outboard end carrying a set of studs mounting the outer wheel thereto.

5 Claims, 3 Drawing Sheets

DUAL WHEEL ADAPTER SYSTEM

BACKGROUND OF THE INVENTION

This invention concerns an adapter system for mounting dual wheel sets on a drive axle of a utility vehicle such as a light truck or camper.

Dual wheel adapters for automotive vehicles have been previously developed which enable sets of two side by side wheels to be mounted to each hub of a drive axle designed to normally mount a single wheel. Such adapters are typically assembled onto the existing wheel studs and secured on the studs by special combination nut-bolt elements which enable both the original wheel and the adapter to be fit to the studs. In such designs, the adapter has an elongated body portion with a mounting flange at the outboard end having a series of studs over which an auxiliary wheel is received, spaced apart from the inside, original wheel.

Typically, these systems are subject to failure since the load of both wheels in each set is carried by the original set of studs.

In one approach, as described in U.S. Pat. No. 4,585,276 special wheels having offset centers are both mounted to the outboard end of the adapter.

However, that system requires two special wheels, and the original wheel cannot be used in converting to a dual wheel set up.

SUMMARY OF THE INVENTION

The present invention comprises a dual wheel adapter system with a mounting of the wheels in each set to the axle hub structure while enabling use of a conventional wheel in each dual wheel set.

This system comprises an inside wheel having a special configured web center piece secured to a conventional wheel rim. The web center piece has a hole pattern received over the axle hub studs, but also has an auxiliary stud set offset from the hole pattern. The web center piece is preferably formed with a central bore received over the axle hub boss to assist the studs in transmitting loads of the web center piece into the axle.

An elongate adapter extension member is formed at one end with an inside flange having a hole pattern received over the auxiliary studs, and at the other end with an outside flange carrying a stud set adapted to mount a conventional wheel, held thereon with lug nuts.

The adapter extension member is preferably centered on the web center piece by a projecting boss fixed to the one end of the extension member and seated in a counterbore machined in the web center piece.

The center hole of the outside conventional wheel may also be located on an outwardly projecting boss on the other end of the extension member.

The web center piece may be slightly offset with respect to the inside wheel rim to shift the inside wheel inwardly and thereby shift each wheel set inwardly, reducing the total width of the installed dual wheel set and reducing the overhang load imposed on the axle bearing.

DETAILED DESCRIPTION

In the following detailed description, certain specific terminology will be employed for the sake of clarity, and a particular embodiment described in accordance with the requirements of 35 USC §112, but it is to be understood that this is not intended to be limiting inasmuch as the invention is capable of taking many forms and variations within the scope of the appended claims.

Figure 1:
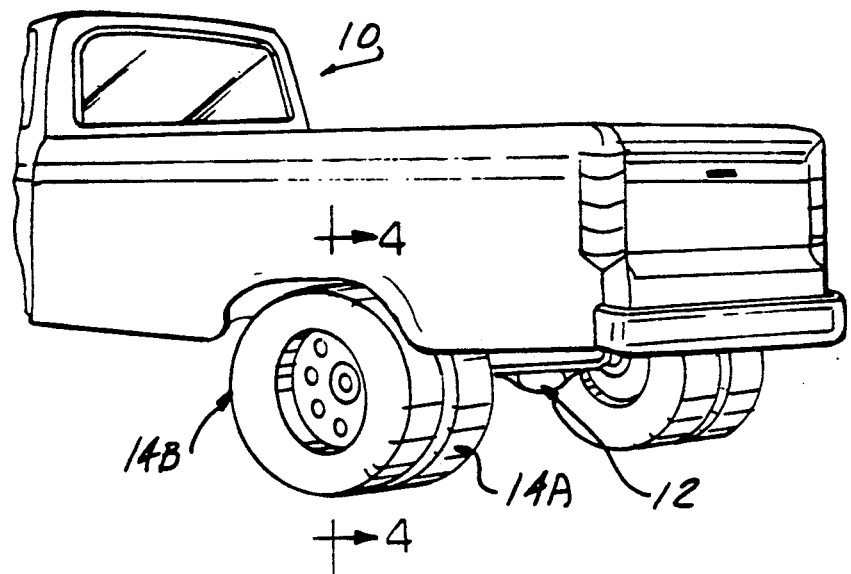
FIG. 1 is a fragmentary rearward perspective of a utility vehicle having dual wheel sets installed on the rear axle of the vehicle by means of the adapter system according to the present invention.

Referring to FIG. 1 a light duty pickup truck 10 is shown. Such vehicles are designed to mount a single wheel to a mounting hub attached to either end of a drive axle mounted within a rear axle assembly 12. The adapter system according to the present invention enables mounting an inside wheel 14A and an outside wheel 14B to each end of the drive axle to provide dual wheel sets in place of the original single wheel installation. The present adapter system provides improved strength over many prior art adapters by transmitting the load of the outer wheel directly into the axle, and not solely through the original wheel studs.

Figure 2:
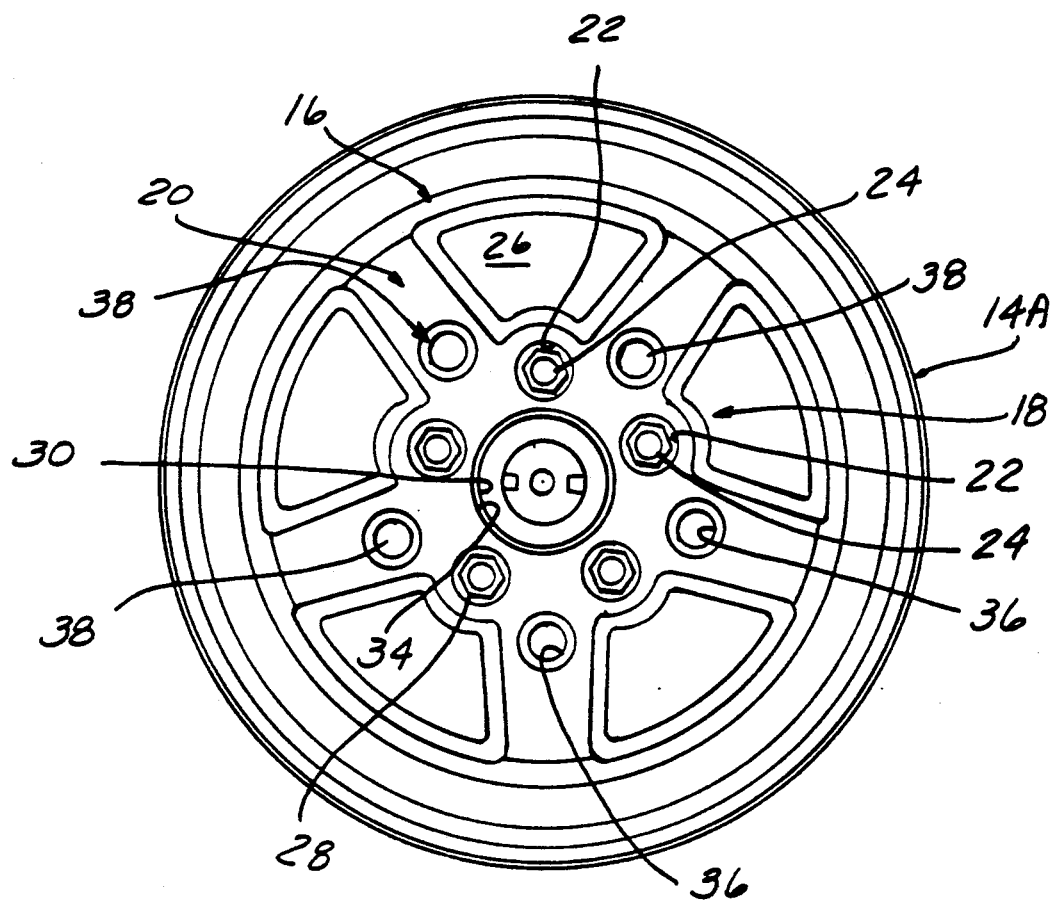
FIG. 2 is an endwise view of a mounted inside wheel, having the specially configured web center piece comprising one of the components of the adapter system shown in FIG. 2.

FIG. 2 illustrates a specially configured web center piece 16 having a rim 17 welded, riveted, or otherwise affixed to the inside wheel 14A, which comprises a component of the adapter system according to the present invention. The web center piece 16 may be cast, and has a center portion 18 supported on a series of spokes 20 which is formed with a series of stud holes 22 arrayed in a pattern to receive the original axle hub studs 24 protruding through the brake drum 26. The inside wheel 14A is held thereon by lug nuts 28.

The center portion 18 is also formed with a bore 30 which is slidably received over an end boss 32 of the drive axle to be centered and supported thereon.

The bore 30 also includes a counterbore section 34 used to center and support an adapter extension member as described below.

The center portion 18 has a series of holes 36 each of which mounting a series of auxiliary studs 38 spaced intermediate the original studs 24 and spaced radially outward therefrom.

Figure 3:
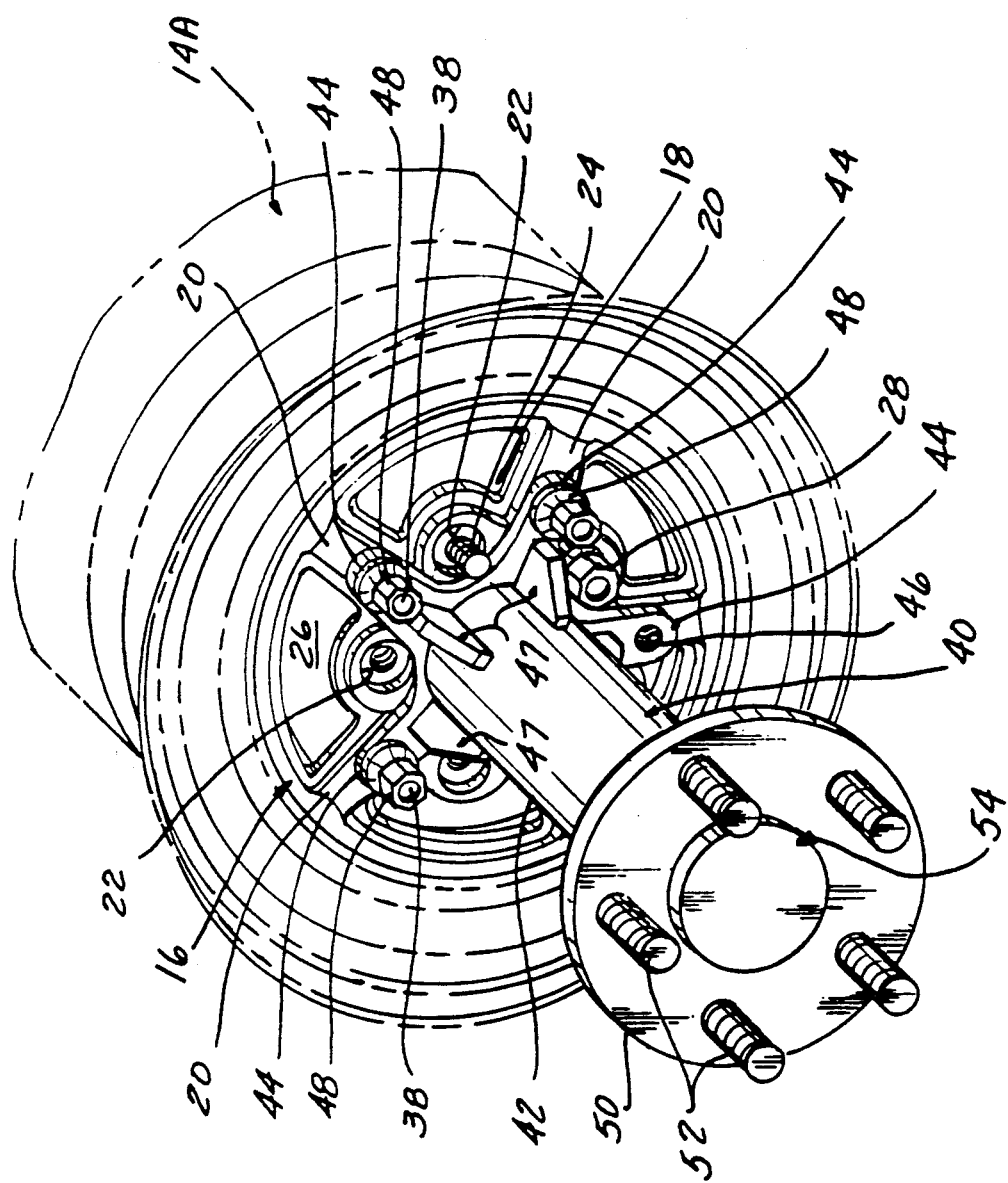
FIG. 3 is an enlarged perspective view of the components of the adapter system according to the present invention installed on an axle hub.

FIG. 3 illustrates the adapter extension member 40 installed onto the web center piece 16 shown with several of the studs 24 and lug nuts 28 removed to show details of the installation. The adapter extension member 40 includes an elongate connector section, shown as a length of tubing 42. The inside end has a series of radially extending ears 44, each having a hole 46 adapted to mate with a respective auxiliary inside stud 38. Reinforcing gusset plates 47 are welded to each ear 44. Installation of a flanged nut 48 on each auxiliary stud 38 secures the adapter extension member 40 to the web center piece 16. The ears 44 are circumferentially spaced to create clearances for the original studs 24 and lug nuts 28 so that these can be installed without interference with the adapter extension member 40.

Welded to the outboard end of the connector section 42 is a stud flange 50 carrying a series of studs 52 arranged in a pattern adapted to mate with the hole pattern in the conventional outside wheel 14B, held thereon with a second set of lug nuts 24. A projecting boss 54 is preferably provided to center and support the outside wheel 14B on the adapter extension member 40.

Figure 4:
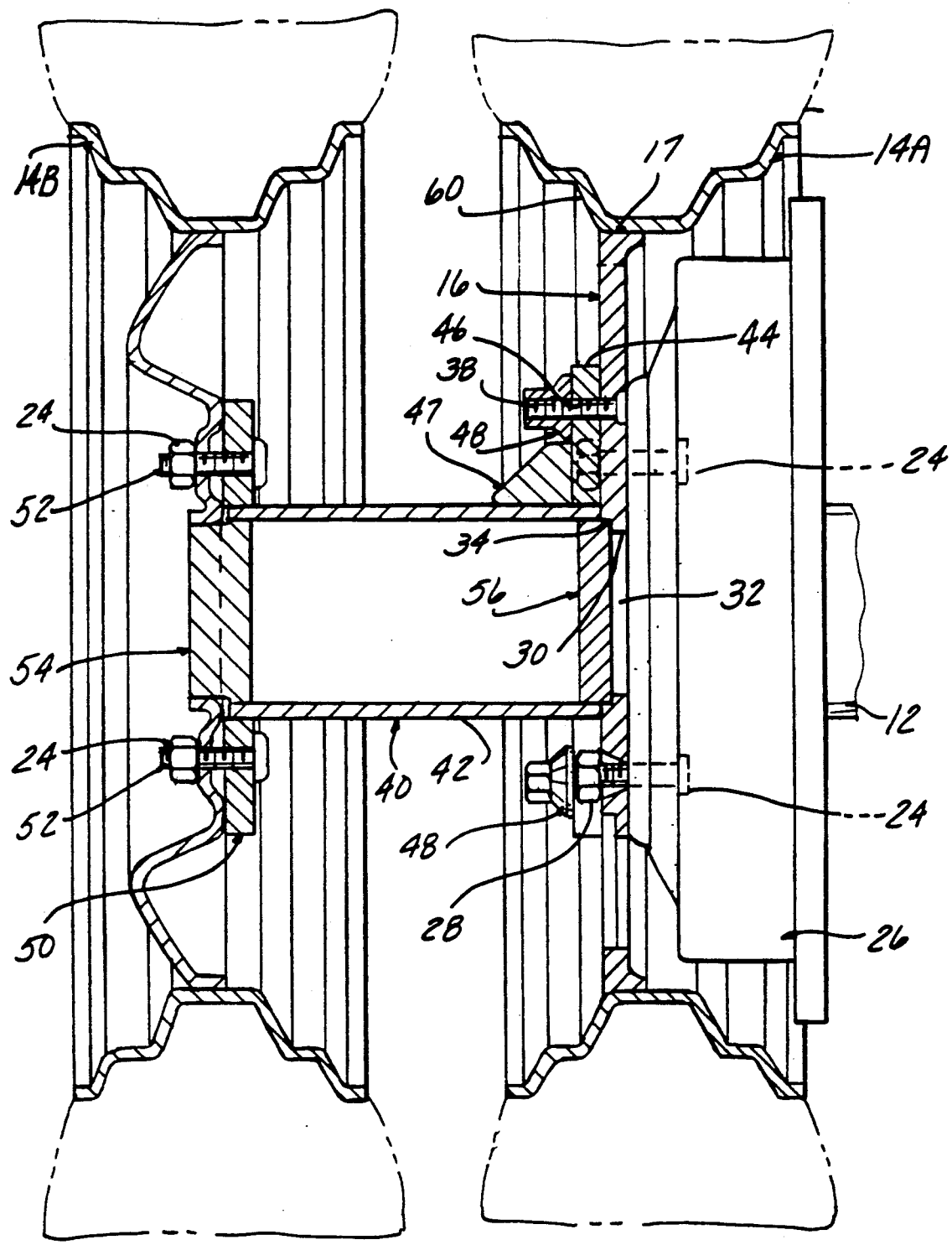
FIG. 4 is a fragmentary view of the section taken through the installed dual wheel adapter system shown in FIG. 1.

FIG. 4 shows that the adapter extension member 40 has a plug 56 welded within the inside end of the connector section 42 which projects to be fit into the counterbore 34 in the center portion 18 of the web center piece 16.

Accordingly, the load of the outer wheel 14B is transmitted into the axle through the auxiliary studs 38 and the web center piece rather than the original studs 24 to greatly improve the strength of the adapter system.

The rim 17 of the web center piece 16 can be offset outwardly within the rim 60 of the inside wheel 14A to shift the wheel set towards the vehicle, reducing the overall width of the vehicle with a dual wheel package and reducing the axle bearing load by shortening the overhang of the wheel set.

Thus an adapter system can be provided which enables the use of the original wheels, each installed as the outside wheel 14B, the inside wheel 14A having the special web center piece 16 and adapter extension member 40 provided as a part of the adapter system.

Many variations of the specifics of the above described design are possible, such as the means for locating the adapter extension member 40 onto the web center piece 16, i.e., by using projecting locating features on the web center portion 18.

The adapter extension member 40 instead being of welded construction, may advantageously be made as a casting, or, for example instead of a tube, flat crossed webs could be utilized.

While a five stud wheel hole pattern has been shown, the invention is of course adaptable to six or other number stud patterns by suitable reconfiguration of the web center piece and other components.

I claim:

1. A dual wheel adapter system for mounting a set of dual wheels to either end of a drive axle of a utility vehicle, said drive axle having a hub carrying a set of wheel studs, said adapter system comprising:
    an inside wheel having a web center piece affixed within the outer rim thereof and having an axle wheel stud hole pattern formed therein configured to receive said axle wheel studs, said inside wheel secured thereon with a set of lug nuts;
    an auxiliary set of studs arranged in a circumferential pattern offset from said axle wheel stud hole pattern in which an auxiliary stud is interposed between each pair of wheel studs, each auxiliary stud mounted at one end to said web center piece to project axially therefrom away from said hub;
    an adapter extension member having an elongate connector portion received within said axle wheel studs, and also having integral radially projecting structure at an inside end of said extension member positioned against said center piece, said radially projecting structure formed with a hole pattern receiving said set of auxiliary studs, secured thereto with a set of nuts;
    said adapter extension member having an integral flange fixed on an outside end of said adapter extension member carrying a second set of wheel studs arranged in a hole pattern to be adapted to receive a second wheel having a matching hole pattern and secured thereto with lug nuts.

2. The adapter system according to claim 1 wherein said web center piece is formed with a central bore slidably fit over an axle hub portion to be centered and supported thereon.

3. The adapter system according to claim 1 wherein said projecting structure on said connector portion of said extension member comprises a series of ears extending radially out form said extension member, each ear passing between a respective adjacent pair of axle wheel studs when installed on said auxiliary studs, each ear having a hole receiving a respective auxiliary stud and with intermediate clearance spaces between adjacent ears formed for accommodating a respective one of said inside wheel studs and lug nuts.

4. The adapter system according to claim 1 wherein said inside wheel outer rim is offset axially outwardly on said web center piece to shift the inside wheel rim axially inwardly when installed on said drive axle hub.

5. The adapter system according to claim 2 wherein said web center piece is formed with a counterbore aligned with said center bore and said adapter extension member is formed with a projecting boss slidably fit into said counterbore to be located and supported on said web center piece.

* * * * *